United States Patent
Kessler et al.

(10) Patent No.: US 6,963,183 B1
(45) Date of Patent: Nov. 8, 2005

(54) CONTROL CIRCUIT FOR A DIRECT CURRENT MOTOR

(75) Inventors: Martin Kessler, Buehl (DE); Karl-Heinrich Preis, Buehlertal (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/463,507

(22) PCT Filed: Jul. 22, 1998

(86) PCT No.: PCT/DE98/02058

§ 371 (c)(1),
(2), (4) Date: Apr. 19, 2000

(87) PCT Pub. No.: WO99/05763

PCT Pub. Date: Feb. 4, 1999

(30) Foreign Application Priority Data

Jul. 25, 1997 (DE) .......................... 197 32 094

(51) Int. Cl.[7] ................................. H02P 7/00
(52) U.S. Cl. .................. 318/434; 318/139; 361/23; 361/78; 361/82; 361/84; 307/125; 307/140
(58) Field of Search ................... 318/139, 434, 318/444; 388/819, 821, 815; 361/23, 33, 77, 78, 79, 84, 82; 307/112, 125, 127, 140

(56) References Cited

U.S. PATENT DOCUMENTS

| | | | | |
|---|---|---|---|---|
| 3,629,608 A | * | 12/1971 | Trindle ....................... | 307/140 |
| 4,679,112 A | * | 7/1987 | Craig ........................... | 361/33 |
| 4,710,686 A | * | 12/1987 | Guzik ......................... | 318/293 |
| 4,767,952 A | * | 8/1988 | Nollet ......................... | 307/571 |
| 4,873,453 A | * | 10/1989 | Schmerda et al. .......... | 307/130 |
| 5,012,381 A |   | 4/1991 | Elliott et al. .................. | 361/84 |
| 5,142,433 A |   | 8/1992 | Nishibe et al. ............. | 361/117 |
| 5,563,479 A | * | 10/1996 | Suzuli ........................ | 318/139 |
| 5,886,512 A | * | 3/1999 | Becerra ...................... | 323/282 |
| 6,008,999 A | * | 12/1999 | Marrero ...................... | 363/21 |
| 6,087,793 A | * | 7/2000 | Preis ........................... | 318/434 |

* cited by examiner

*Primary Examiner*—Rina Duda
(74) *Attorney, Agent, or Firm*—Kenyon & Kenyon

(57) ABSTRACT

The invention relates to a control circuit for a direct current motor with a reverse pole protection device, which is connected to the electric circuit of the electrolytic capacitor and the free-wheeling diode in order to reduce losses in the reverse pole protection device.

3 Claims, 1 Drawing Sheet

CONTROL CIRCUIT FOR A DIRECT CURRENT MOTOR

FIELD OF THE INVENTION

The present invention relates to a control circuit for a d.c. motor having an electrolytic capacitor connected in parallel to it, a freewheeling diode and a polarity reversal protection device with a transistor switch having a diode connected in parallel to it.

BACKGROUND INFORMATION

Such a control circuit is regarded as known. A polarity reversal protection device suitable for this purpose is described in German Patent No. 39 24 499, in particular with respect to FIG. 4D given there. Using such a polarity reversal protection device for a d.c. motor powered with a battery voltage prevents a short circuit over the freewheeling diode and an inverse diode of a power MOSFET provided for clocked control of the d.c. motor in the event of reversal of polarity of the battery voltage. Furthermore, the polarity reversal protection device prevents destruction of an electrolytic capacitor provided in the control circuit in the event of polarity reversal. With a known control circuit, the polarity reversal protection device is connected to the lead wire or to the outgoing cable of the motor power supply. Therefore, the traditional polarity reversal protection device must be designed for a high power loss accordingly.

SUMMARY OF THE INVENTION

An object of the present invention is to provide a control circuit, so that the power loss of the polarity reversal protection device is reduced.

According to the present invention, the polarity reversal protection device is connected in the electric circuit of the electrolytic capacitor and the freewheeling diode. Due to the arrangement of the polarity reversal protection device in the current path of the electrolytic capacitor and the freewheeling diode, these at-risk components are protected from destruction in the event of polarity reversal. Current flowing through the polarity reversal protection device is much lower than that in the power supply circuit of the motor, so the polarity reversal protection device may also be designed for a lower power loss accordingly. The power loss of the polarity reversal protection device is reduced by a factor on the order of 10 or more, for example.

A simple and reliably functioning design of the polarity reversal protection device is obtained by designing the transistor switch having the diode as a power MOSFET.

An advantageous coupling of the polarity reversal protection device is that the transistor switch having the diode is designed as an n-channel power MOSFET and is connected at its drain terminal to the negative pole of the electrolytic capacitor and to the anode of the freewheeling diode, which is connected at its cathode to the positive side of the d.c. motor; the source terminal is connected to the negative side of the d.c. motor, and the gate terminal is connected across a resistor to a positive voltage. To protect the power MOSFET, one advantageous provision is that a Zener diode is connected between the drain terminal and the gate terminal, its anode being connected to the drain terminal and its cathode being connected to the gate terminal.

Another advantageous arrangement of the polarity reversal protection device is that the transistor switch having the diode is designed as an n-channel power MOSFET and is connected at its drain terminal to the positive side of the d.c. motor; the source terminal is connected to the positive terminal of the electrolytic capacitor and to the cathode of the freewheeling diode, which is connected at its anode to the negative side of the d.c. motor.

The power MOSFET is operated inversely because it contains an integrated diode. In normal operation, i.e., not inverted operation, this diode would short-circuit the polarity reversal protection device in the event of polarity reversal.

In addition, for control of the d.c. motor and for additional protection, the control of the d.c. motor may be clocked by another power MOSFET, and a control unit of the additional power MOSFET may be switched off by the polarity reversal protection device in the event of polarity reversal. The additional power MOSFET and control components are also protected by the polarity reversal protection device. Reverse operation of the d.c. motor with a polarity reversal is not harmful.

DETAILED DESCRIPTION

Figure 1:
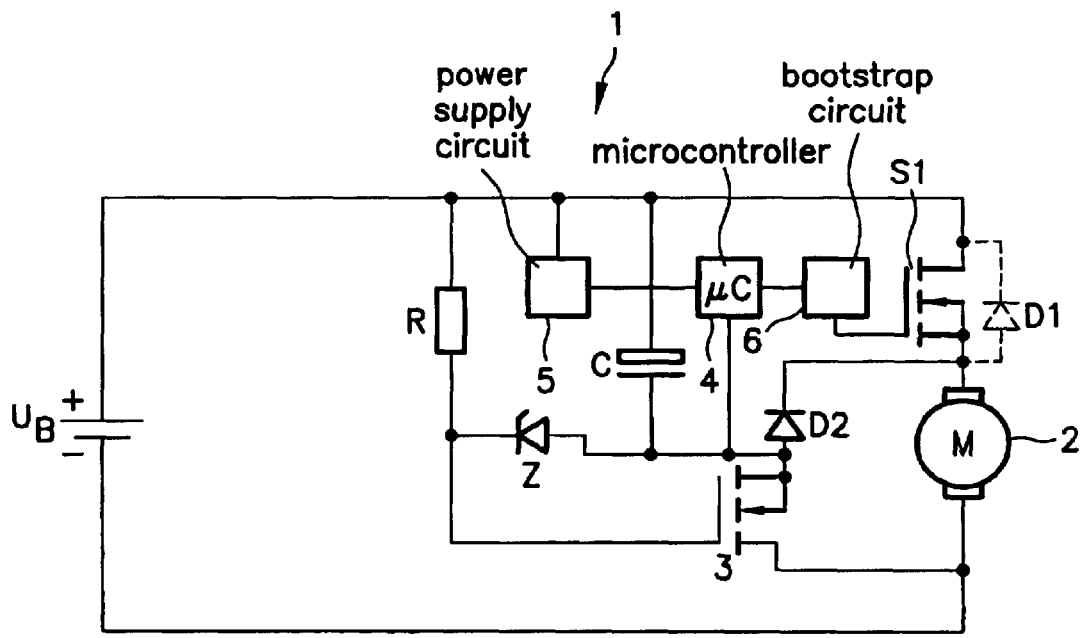
FIG. 1 shows a first embodiment of a control circuit for a d.c. motor having a polarity reversal protection device, with a switching device being connected to its positive branch.

As FIG. 1 shows, a d.c. motor 2, clocked by a switching device S1 having an integrated diode D1, is connected to a battery voltage $U_B$. An electrolytic capacitor C is connected to switching device S1 in parallel to d.c. motor 2 by way of a polarity reversal protection device 3 in the form of an n-channel power MOSFET operated inversely. In addition, a freewheeling diode D2 is also connected in parallel to d.c. motor 2 by way of polarity reversal protection device 3, with freewheeling diode D2 being connected at its cathode to the positive side of d.c. motor 2 and at its anode to the negative side of electrolytic capacitor C and the drain terminal of power MOSFET 3. The source terminal of power MOSFET 3 is connected to the negative side of d.c. motor 2, which is connected to the negative pole of battery voltage $U_B$. The gate terminal of power MOSFET 3 is connected to positive battery voltage $U_B$ across a resistor R. A Zener diode Z is connected between the drain terminal and the gate terminal, its cathode at the gate terminal and its anode at the drain terminal.

In addition, a section of circuit having a microcontroller 4, a power supply circuit 5 and a bootstrap circuit 6 is connected to polarity reversal protection device 3 in such a way that power supply circuit 5 no longer supplies power to microcontroller 4 when the switch of polarity reversal protection device 3 is opened, i.e., when there is a polarity reversal. Microcontroller 4 controls switching device S1 by a driver.

In normal operation, the switch of polarity reversal protection device 3 in the form of a power MOSFET functioning as a switching unit is closed. If battery voltage $U_B$ is polarized incorrectly, power MOSFET 3 blocks, i.e., the switching unit is opened. An integrated inverse diode connected in parallel to the drain-source path is also in the blocked direction. Therefore, the current path through electrolytic capacitor C and freewheeling diode D2 is interrupted, and only a reverse current flows through d.c. motor 2 without being harmful to the latter. Polarity reversal protection device 3 is arranged outside the power supply circuit of d.c. motor 2 in an electric circuit through which much less current flows with the proper polarity, namely only the current through electrolytic capacitor C and the freewheeling current, thus creating a low power loss in polarity reversal protection device 3 accordingly due to the path resistance between the drain terminal and the source terminal.

Figure 2:
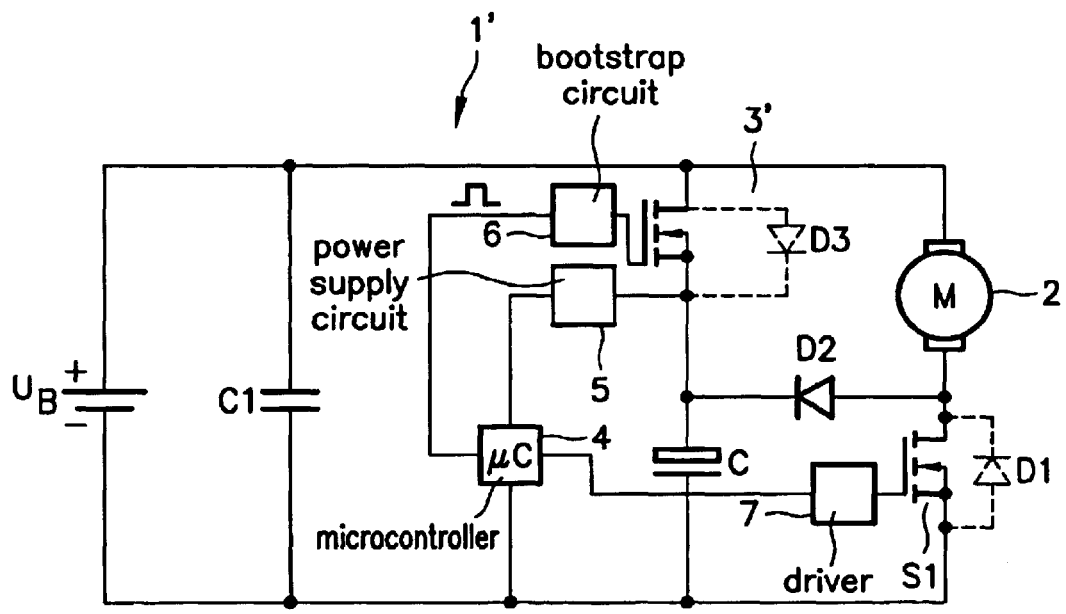
FIG. 2 shows a second embodiment for a control circuit of a d.c. motor having a polarity reversal protection device, with a switching device being connected to its negative branch.

The design according to FIG. 2, also showing a control circuit 1' for d.c. motor 2 over a clocked switching device S1 having a parallel-connected, integrated diode D1, is like the design shown in FIG. 1 and is similar in operation. In contrast with the design according to FIG. 1, switching: unit 3', which is preferably also designed as an inversely operated n-channel power MOSFET having an integrated inverse diode D3, is connected between the positive terminal of electrolytic capacitor C and positive battery voltage $U_B$. Freewheeling diode D2 is connected at its cathode to the positive terminal of electrolytic capacitor C, and at its anode on the negative side of d.c. motor 2 it is connected between the d.c. motor and switching device S1. Another capacitor C1 in the form of a film capacitor, which is not necessary and functions to suppress interference, is between the positive and negative power supply lines. A corresponding capacitor may also be provided in the embodiment according to FIG. 2.

A section of the circuit having a microcontroller 4, a power supply circuit 5 and a bootstrap circuit 6 is connected to the polarity reversal protection device in the form of a switching unit 3' in such a way that power supply circuit 5 no longer supplies power to microcontroller 4 when the switch of switching unit 3' is opened, i.e., when there is a reversal of polarity according to the discussion with reference to FIG. 1. Microcontroller 4 controls switching device S1 by a driver 7 for operating d.c. motor 2 with pulse width modulation at a clock frequency of 20 kHz, for example.

Thus, when there is a reversal of polarity of battery voltage $U_B$, the switch of switching unit 3' is opened or the power MOSFET blocks. This prevents a current from flowing through electrolytic capacitor C and freewheeling diode D2, so they are protected. Furthermore, microcontroller 4 is no longer supplied with voltage, so the control of switching device S1 is turned off. Thus with this design, reliable protection of at-risk components is achieved with a low power loss of the polarity reversal protection device.

What is claimed is:

1. A control circuit for a d.c. motor, comprising:
a freewheeling diode circuit;
an electrolytic capacitor circuit coupled in parallel with the d.c. motor; and
a polarity reversal protection device situated outside a power supply circuit of the d.c. motor, the protection device including a transistor switch and a diode coupled in parallel with the transistor switch, the protection device being coupled into the freewheeling diode circuit and being coupled into the electrolytic capacitor circuit;
wherein the transistor switch includes an n-channel power MOSFET, the transistor switch having a drain terminal coupled to a negative terminal of an electrolytic capacitor of the electrolytic capacitor circuit and to an anode of a freewheeling diode of the freewheeling diode circuit, a cathode of the freewheeling diode being coupled to a positive side of the d.c. motor, a source terminal of the transistor switch being coupled to a negative side of the d.c. motor, a gate terminal of the transistor switch being coupled across a resistor to a positive voltage.

2. The control circuit according to claim 1, further comprising a Zener diode coupled between the drain terminal and the gate terminal, an anode of the Zener diode being coupled to the drain terminal and a cathode of the Zener diode being coupled to the gate terminal.

3. A control circuit for a d.c. motor, comprising:
a freewheeling diode circuit;
an electrolytic capacitor circuit coupled in parallel with the d.c. motor; and
a polarity reversal protection device situated outside a power supply circuit of the d.c. motor, the protection device including a transistor switch and a diode coupled in parallel with the transistor switch, the protection device being coupled into the freewheeling diode circuit and being coupled into the electrolytic capacitor circuit;
wherein the transistor switch includes an n-channel power MOSFET, a drain terminal of the transistor switch being coupled to a positive side of the d.c. motor, a source terminal of the transistor switch being coupled to a positive terminal of an electrolytic capacitor of the electrolytic capacitor circuit and to a cathode of a freewheeling diode of the freewheeling diode circuit, an anode of the freewheeling diode being coupled to a negative side of the d.c. motor.

* * * * *

UNITED STATES PATENT AND TRADEMARK OFFICE
CERTIFICATE OF CORRECTION

PATENT NO. : 6,963,183 B1 Page 1 of 1
DATED : November 8, 2005
INVENTOR(S) : Kessler et al.

It is certified that error appears in the above-identified patent and that said Letters Patent is hereby corrected as shown below:

<u>Column 1,</u>
Line 17, change "respect to FIG. 4D given there." to -- respect to FIG. 4D. --.
Line 58, change "of the d.c. motor;" to -- of the d.c. motor, --.

Signed and Sealed this

Eleventh Day of April, 2006

JON W. DUDAS
*Director of the United States Patent and Trademark Office*